US010425310B2

(12) United States Patent
Thubert et al.

(10) Patent No.: US 10,425,310 B2
(45) Date of Patent: Sep. 24, 2019

(54) NETWORK DEVICE MITIGATION AGAINST ROGUE PARENT DEVICE IN A TREE-BASED NETWORK

(71) Applicant: Cisco Technology, Inc., San Jose, CA (US)

(72) Inventors: Pascal Thubert, La Colle sur Loup (FR); Eric Michel Levy-Abegnoli, Valbonne (FR); Patrick Wetterwald, Mouans Sartoux (FR); Jean-Philippe Vasseur, Anchorage, AK (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 436 days.

(21) Appl. No.: 14/757,525

(22) Filed: Dec. 23, 2015

(65) Prior Publication Data

US 2017/0187594 A1 Jun. 29, 2017

(51) Int. Cl.
*H04L 12/26* (2006.01)
*H04L 12/24* (2006.01)

(52) U.S. Cl.
CPC ........ *H04L 43/0864* (2013.01); *H04L 41/042* (2013.01); *H04L 41/12* (2013.01); *H04L 43/08* (2013.01); *H04L 43/0829* (2013.01); *H04L 43/0852* (2013.01)

(58) Field of Classification Search
CPC . H04L 43/0876; H04L 41/12; H04L 43/0864; H04L 41/042; H04L 43/08; H04L 43/0829; H04L 43/0852; H04W 84/18; H04W 4/80; H04W 84/12; H04W 76/10; H04W 8/005; H04W 76/19; H04W 76/30; H04W 36/30; H04W 36/305; H04W 36/0079; H04W 48/18
See application file for complete search history.

(56) References Cited

U.S. PATENT DOCUMENTS

| 9,781,601 B1* | 10/2017 | Kurani | H04W 12/08 |
| 2005/0265259 A1* | 12/2005 | Thubert | H04L 45/46 370/255 |
| 2006/0002342 A1* | 1/2006 | Lin | H04W 36/30 370/331 |

(Continued)

OTHER PUBLICATIONS

T. Winter, RPL: IPv6 Routing Protocol for Low-Power and Lossy Networks, Mar. 2012, Internet Engineering Task Force (IETF), Request for Comments: 6550, ISSN: 2070-1721, p. 1-157.*

(Continued)

*Primary Examiner* — Wing F Chan
*Assistant Examiner* — Billy H Ng
(74) *Attorney, Agent, or Firm* — Leon R. Turkevich

(57) ABSTRACT

In one embodiment, a method comprises: a network device, having attached to a first parent device in a tree-based network topology, attaching to a second parent device advertising better network performance than the first parent device; and the network device detaching from the second parent device, and reattaching to the first parent device, in response to the network device determining the corresponding network performance via the second parent device is worse than any one of the advertised better network performance, the corresponding network performance via the first parent device, or an expected network performance via the second network device.

20 Claims, 6 Drawing Sheets

(56) References Cited

U.S. PATENT DOCUMENTS

| | | | |
|---|---|---|---|
| 2007/0127417 A1* | 6/2007 | Kalika | H04N 21/4126 370/338 |
| 2008/0280621 A1* | 11/2008 | Soomro | H04W 48/08 455/450 |
| 2010/0124203 A1* | 5/2010 | Tenny | H04W 36/24 370/331 |
| 2010/0173626 A1* | 7/2010 | Catovic | H04W 76/027 455/423 |
| 2011/0080853 A1 | 4/2011 | Thubert et al. | |
| 2015/0031404 A1* | 1/2015 | Yada | H04W 76/25 455/508 |
| 2015/0131483 A1* | 5/2015 | Colban | H04W 48/16 370/254 |
| 2015/0195171 A1 | 7/2015 | Mermoud et al. | |
| 2016/0072697 A1 | 3/2016 | Thubert et al. | |
| 2016/0302079 A1* | 10/2016 | Chari | H04W 16/26 |
| 2017/0026859 A1* | 1/2017 | Ahmadzadeh | H04W 24/08 |
| 2017/0048789 A1* | 2/2017 | Tan | H04W 36/30 |

OTHER PUBLICATIONS

Motorola, White Paper, "Tired of Rogues? Solutions for Detecting and Eliminating Rogue Wireless Networks", [online], Oct. 2011, [retrieved on Dec. 9, 2015]. Retrieved from the Internet: <URL: http://www.opticalphusion.com/downloads/products/networks/airdefense/CS.pdf>, pp. 1-12.

Sarahun, "Detecting and Preventing Rogue Devices in the Network", [online], Aug. 8, 2007, SANS Institute InfoSec Reading Room, [retrieved on Dec. 9, 2015]. Retrieved from the Internet: <URL: https://www.sans.org/reading-room/whitepapers/detection/detecting-preventing-rogue-devices-network-1866>, 63 pages.

Thubert, Ed., et al., "An Architecture for IPv6 over the TSCH mode of IEEE 802.15.4e", Oct. 27, 2014, [retrieved on Dec. 11, 2015]. Retrieved from the Internet: <URL: https://tools.ietf.org/html/draft-ieff-6tisch-architecture-04>, pp. 1-32.

Vasseur, "Terms Used in Routing for Low-Power and Lossy Networks" Internet Engineering Task Force, Request for Comments: 7102, Jan. 2014, pp. 1-8.

Winter, et al., "RPL: IPv6 Routing Protocol for Low-Power and Lossy Networks", Internet Engineering Task Force (IETF), Request for Comments: 6550, Mar. 2012, pp. 1-157.

Thubert et al., U.S. Appl. No. 14/482,571, filed Sep. 10, 2014.

Thubert et al., U.S. Appl. No. 14/590,672, filed Jan. 6, 2015.

Paxson et al., "Computing TCP's Retransmission Timer", Internet Engineering Task Force (IETF), Request for Comments: 2988, Nov. 2000, pp. 1-8.

Paxson et al., "Computing TCP's Retransmission Timer", Internet Engineering Task Force (IETF), Request for Comments: 6298, Jun. 2011, pp. 1-11.

* cited by examiner

NETWORK DEVICE MITIGATION AGAINST ROGUE PARENT DEVICE IN A TREE-BASED NETWORK

TECHNICAL FIELD

The present disclosure generally relates to network device mitigation against a rogue parent device in a tree-based data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing metrics (advertised in the DIO) to a prescribed objective function of the RPL instance: the prescribed objective function is used to compute path cost for selection of a preferred parent. The "child" network device, upon attaching to its parent, can output its own DIO with updated metrics that enable other network devices to discover the DODAG, learn the updated metrics, and select a DODAG parent. Hence, network devices can select a parent (e.g., from among multiple advertising parent devices) based on the metrics specified in the corresponding DIO advertised by the parent.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: a network device, having attached to a first parent device in a tree-based network topology, attaching to a second parent device advertising better network performance than the first parent device; and the network device detaching from the second parent device, and reattaching to the first parent device, in response to the network device determining the corresponding network performance via the second parent device is worse than any one of the advertised better network performance, the corresponding network performance via the first parent device, or an expected network performance via the second network device.

In another embodiment, an apparatus comprises a device interface circuit and a processor circuit. The device interface circuit is configured for detecting a first parent device in a tree-based network topology, and further configured for detecting a second parent device. The processor circuit is configured for causing the apparatus, having attached to first parent device as a network device, to attach to the second parent device in response to the second parent device advertising better network performance than the first parent device. The processor circuit further is configured for detaching from the second parent device, and reattaching to the first parent device, in response to the processor circuit determining the corresponding network performance via the second parent device is worse than any one of the advertised better network performance, the corresponding network performance via the first parent device, or an expected network performance via the second network device.

In another embodiment, one or more non-transitory tangible media are encoded with logic for execution by a machine, and when executed by the machine operable for: the machine, implemented as a network device having attached to a first parent device in a tree-based network topology, attaching to a second parent device advertising better network performance than the first parent device; and detaching from the second parent device, and reattaching to the first parent device, in response to determining the corresponding network performance via the second parent device is worse than any one of the advertised better network performance, the corresponding network performance via the first parent device, or an expected network performance via the second network device.

DETAILED DESCRIPTION

Particular embodiments enable a network device in a tree-based network topology (e.g., a RPL network device in a DODAG topology) to avoid an attack by a rogue network device attempting to impersonate as a root or a parent device in a tree-based topology such as a DODAG topology, without the necessity of cryptographic authentication using security keys.

Figure 1A:
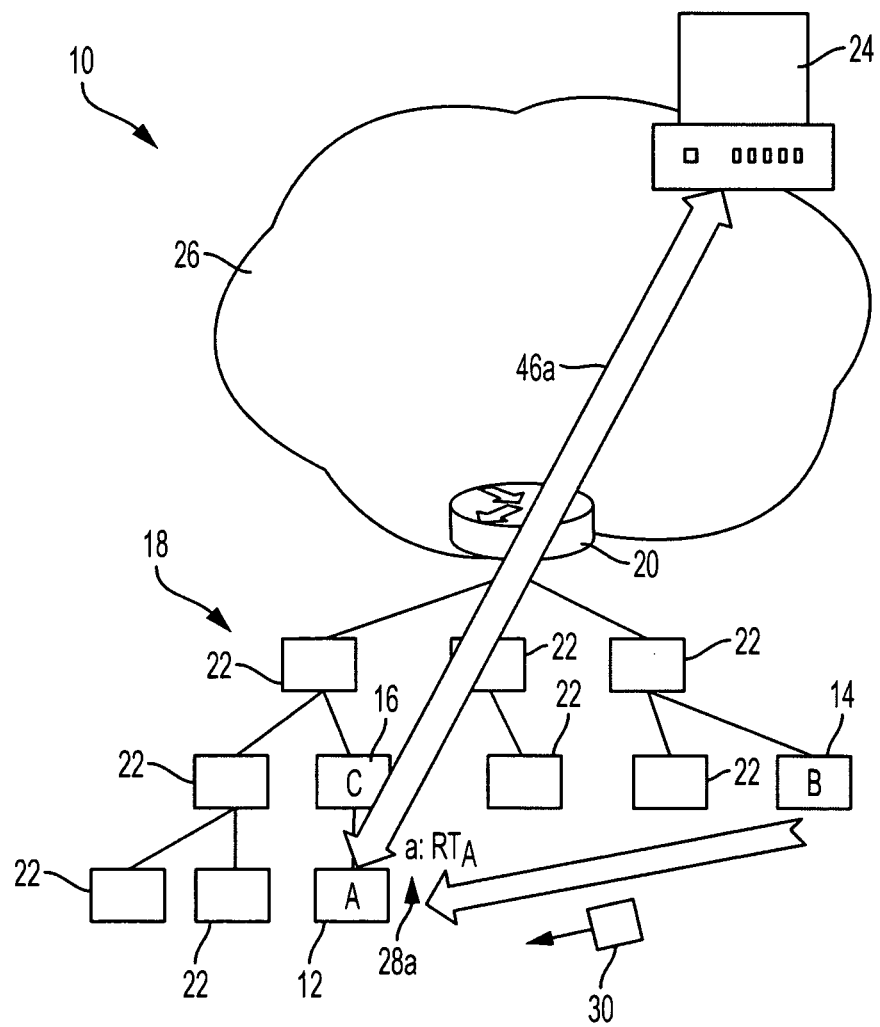
FIGS. 1A, 1B, and 1C illustrate an example network having an apparatus detaching from an advertising parent device and reattaching to a prior parent device in response to worse network performance via the advertising parent device, according to an example embodiment.
Figure 1B:
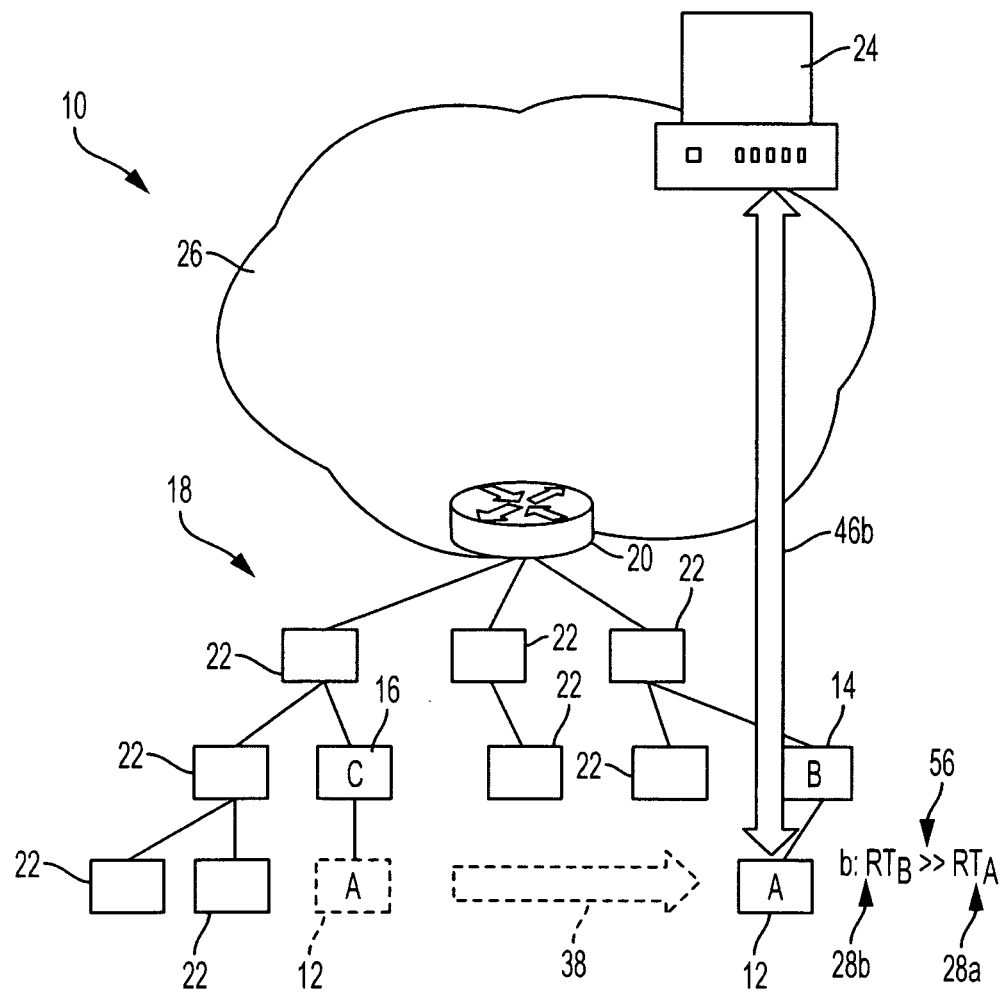
Figure 1C:
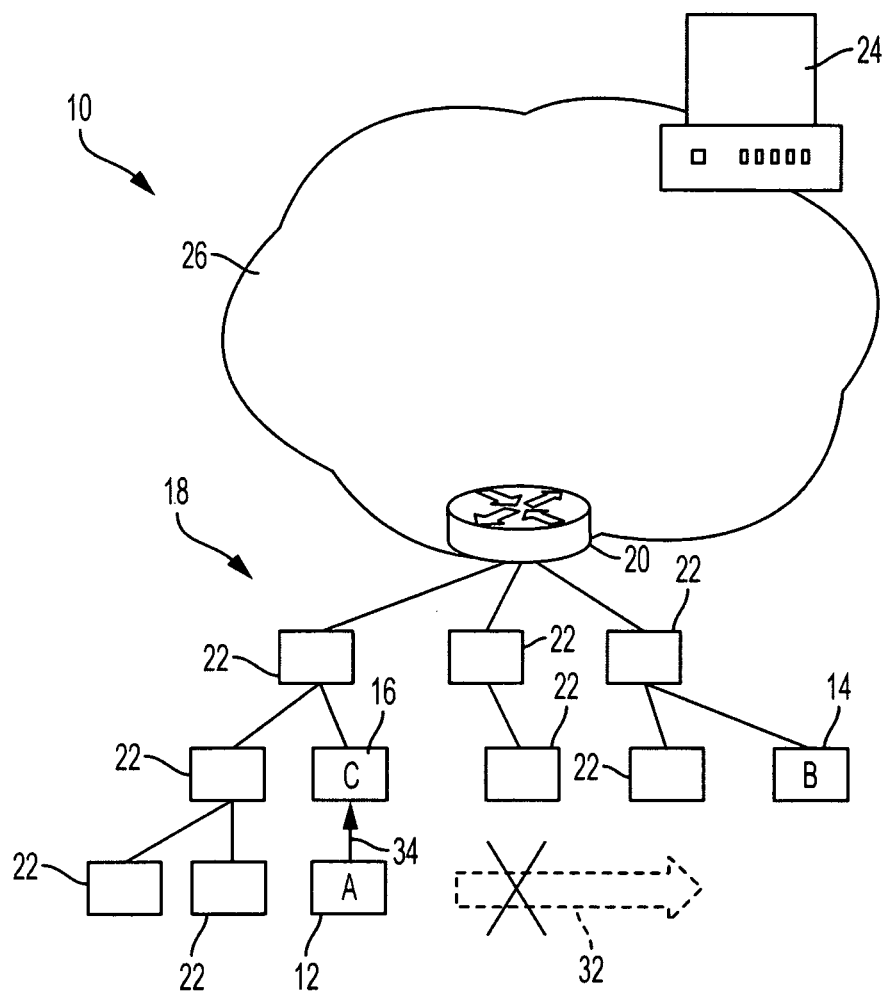

FIGS. 1A, 1B, and 1C illustrates an example network 10 having an apparatus "A" 12 detaching from an advertising parent device "B" 14 and reattaching to a prior parent device "C" 16 in response to worse network performance via the advertising parent device 14, according to an example embodiment. The apparatus 12, also referred to as a "network device" 12, can be implemented as a RPL network device having constrained processing power, memory, and/or energy (e.g., battery power). The advertising parent network device 14, also referred to herein as a "rogue network device" 14, is assumed to be a malicious (or malfunctioning) network device that outputs false metrics, thereby advertising a better network performance than the prior parent device 16. The prior parent device 16, also referred to herein as the "first parent device" 16, is a properly-configured RPL network device that can output advertisement messages (e.g., DIOs) advertising associated metrics relative to its membership in the tree-based topology 18.

The tree-based topology 18 comprises a plurality of other RPL network devices 22 and is rooted by a root network device (i.e., "root") 20. Any of the network devices 12, 14, 16 can be connected to the DODAG 18 and the root 20 by wireless data links. The root 20 can have a wired or wireless data link with one or more of the RPL network devices 22, and the root 20 also can have a wired or wireless data link to an access router (not shown) providing reachability to an identifiable destination network device 24 via a local area network (LAN) and/or wide area network (WAN) 26. Although FIGS. 1A, 1B, and 1C illustrate the tree-based topology 18 as a tree rooted at the root 20, any one of the network device 12, the rogue network device 14, the first parent device 16, and any one of the RPL network devices 22 could have two or more data links to a "parent device", such that the topology 18 could be implemented as a DAG or a DODAG under RFC 6550. Hence, the topology 18 also can be referred to herein as a DODAG.

The Internet Engineering Task Force (IETF) Request for Comments (RFC) 6550 describes DODAG formation, where a network device 12 can select one or more attachment points (e.g., the first parent device 16 or any one of the RPL network devices 22) to the DODAG 18 based on receiving DIOs from respective parent network devices in the DODAG 18, each DIO specifying prescribed attributes of the corresponding parent network device 16 and/or 22 in the DODAG. The network device 12 can apply one or more prescribed optimization objectives (i.e., Objective Function) to identify one or more attachment points based on the metrics specified in the DIOs, in order to reach the DODAG root 20 at a minimal path cost.

A network device 12, however, could detect a "false DIO message" 30 from a rogue network device 14 that maliciously impersonates either the DODAG root 20, or a parent device 16 and/or 22 having better network performance than other (valid) parent devices in the DODAG 18, based on the rogue network device 14 outputting false DIO messages 30 specifying false metrics suggesting the better network performance. Hence, a network device 12 could unknowingly attach to a malicious rogue network device 14 that prevents network traffic from the network device 12 from reaching the DODAG root 20; the rogue network device 14 also could execute a "man-in-the-middle" attack by forwarding network traffic from an attached network device (i.e., its "child" network devices or its "children") only after inspection of the network traffic.

Attempts to implement security do not necessarily guarantee that a rogue network device 14 cannot exploit a compromised node using stolen credentials. Further, requiring security keys for secure advertisements and network device authentication can require substantial memory and processor resources that are impractical and expensive in RPL nodes implemented as low-power devices having constrained resources.

The particular embodiments enable the network device 12 to determine that the rogue network device 14 provides worse network performance that warrants detaching (32 of FIG. 1C) from the rogue network device 14, reattaching (34 of FIG. 1C) to the first parent device 16, and avoiding future attachments to the rogue network device 14. The "worse network performance" can be based on a comparison by the network device 12 between the corresponding network performance (28b of FIG. 1B) by the rogue network device 14, relative to any one of an "advertised better network performance" 30 advertised by the advertising parent device, the corresponding network performance 28a provided via the first parent device 16, or an expected network performance via the advertising parent device that is determined by the network device 12.

Hence, the example embodiments enable a network device 12 to mitigate against attaching (38 of FIG. 2) to the rogue network device 14 in the DODAG 18 by detaching 32 from the rogue network device 14 in response to determining the corresponding network performance 28b by the rogue network device 14 is worse than the corresponding network performance 28a by the first parent device 16, and reattaching 34 to the first parent device 16. The network device 12 can compare the respective network performances 28a and 28b within a relatively short time after attachment to the rogue network device 14, using for example performance test data that does not compromise network security by the network device 12 (e.g., a test MAC address, a test Internet Protocol (IP) address, test credentials, etc.).

In one embodiment, since the network device 12 can establish concurrent connections to the rogue network device 14 and the first parent device 16, the network device 12 does not need to necessarily detach from the first parent device 16 during attachment to the rogue network device 14, rather attachment to the rogue network device 14 can refer to the network device 12 designating the rogue network device 14 as a primary attachment point and the first parent device 16 as an alternate (backup) attachment point in an internal table (36 of FIG. 2) of candidate parents; hence the "reattaching" 34 to the first parent device 16 as described herein can refer to the network device 12 re-designating the first parent device 16 as the primary attachment point. Any reference to "detaching" 32 from the rogue network device 14 can refer to the network device 12 deleting the rogue network device 14 from the parent candidate table 36 (and optionally adding the rogue network device 14 to a "prohibited parents" list).

Figure 2:
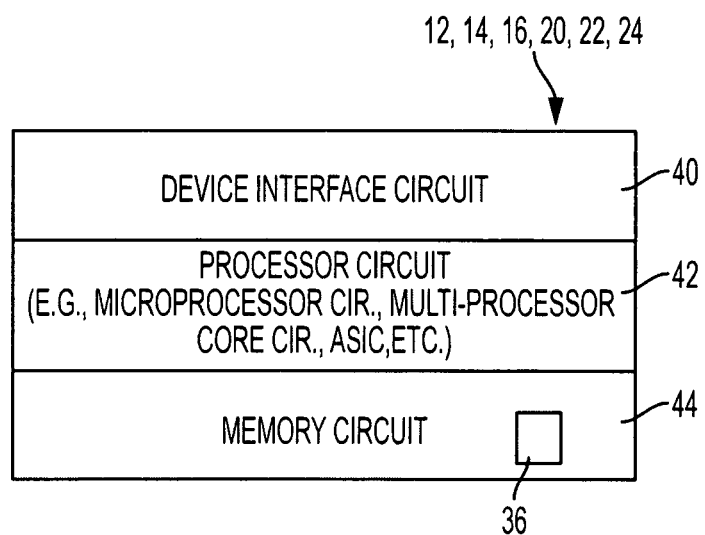
FIG. 2 illustrates an example implementation of any one of the network devices of FIG. 1, according to an example embodiment.

FIG. 2 illustrates an example implementation of any one of the devices 12, 14, 16, 20, 22, and/or 24 of FIGS. 1A, 1B, and/or 1C, according to an example embodiment. Each apparatus 12, 14, 16, 20, 22, and/or 24 is a physical machine (i.e., a hardware device) configured for implementing network communications with other physical machines 12, 14, 16, 20, 22, and/or 24 via the data network 10. The term "configured for" or "configured to" as used herein with respect to a specified operation refers to a device and/or machine that is physically constructed and arranged to perform the specified operation.

Each apparatus 12, 14, 16, 20, 22, and/or 24 can include a device interface circuit 40, a processor circuit 42, and a memory circuit 44. The device interface circuit 40 can include one or more distinct physical layer transceivers for communication with any one of the other devices 12, 14, 16, 20, 22, and/or 24; the device interface circuit 40 also can include an IEEE based Ethernet transceiver for communications with the devices of 12, 14, 16, 20, 22, and/or 24 via any of the data links illustrated in FIGS. 1A-1C (e.g., a wired or wireless link as appropriate, an optical link, etc.). The processor circuit 42 can be configured for executing any of the operations described herein, and the memory circuit 44 can be configured for storing any data or data packets as described herein. Typically the parent candidate table 36 can be stored in at least the network device 12; depending on implementation, the parent candidate table 36 need not be stored in the rogue network device 14, the root 20, or the destination network device 24.

Any of the disclosed circuits of the devices 12, 14, 16, 20, 22, and/or 24 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
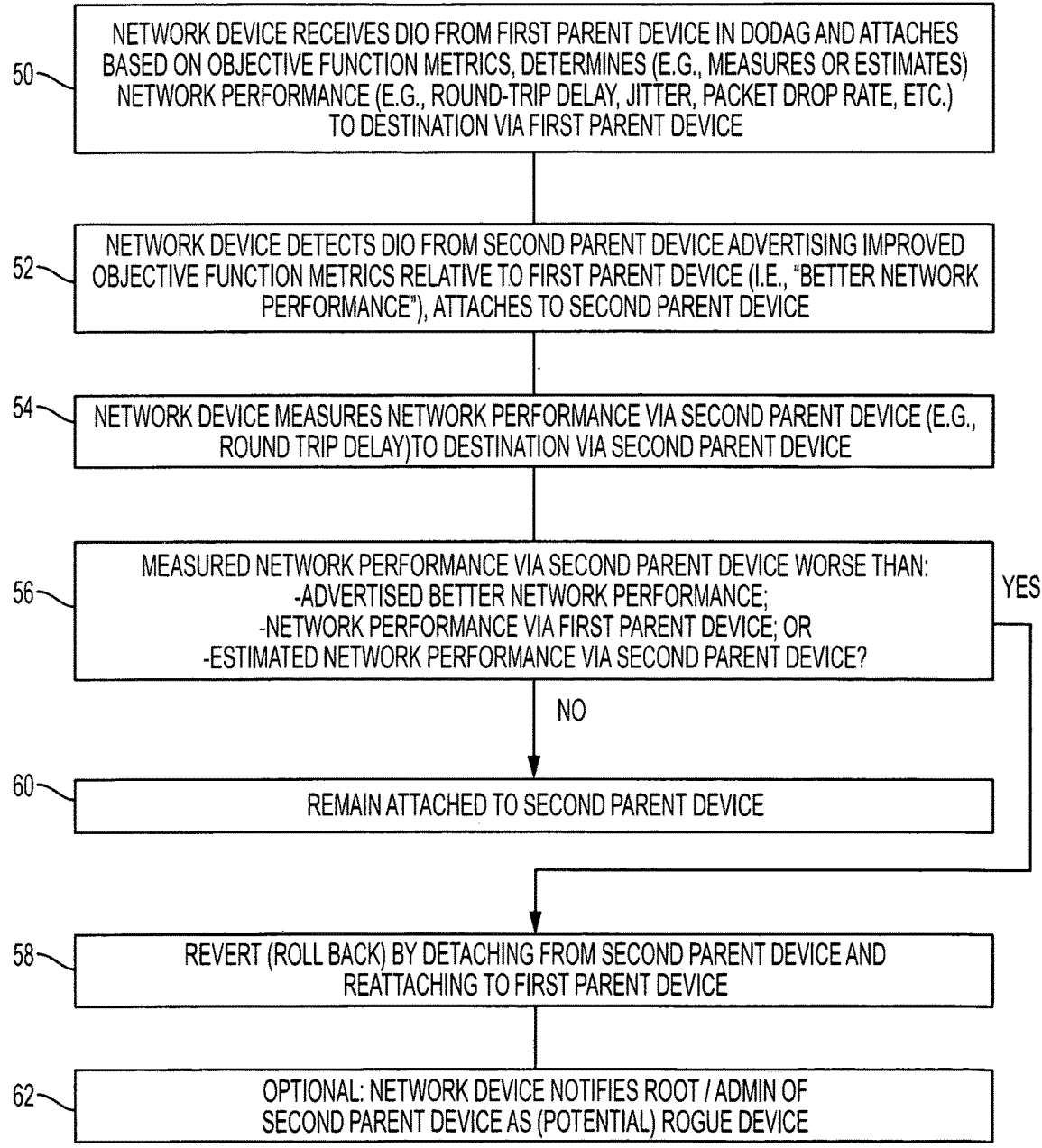
FIG. 3 illustrates an example method of a network device detaching from an advertising parent device and reattaching to a parent device in response to worse network performance via the advertising parent device, according to an example embodiment.

FIG. 3 illustrates an example method of a network device detaching from an advertising parent device and reattaching to a parent device in response to worse network performance via the advertising parent device, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

The device interface circuit 40 of the network device 12 is configured for detecting in operation 50 an unsecured DIO from the first parent device 16, generated for example according to RFC 6550. In particular, the unsecured DIO from the first parent device 16 does not include any security key, or at least does not require any security keys for processing of the received DIO by the processor circuit 42 of the network device 12. The processor circuit 42 of the network device 12 can detect in operation 50 the first parent device 16 in response to the received DIO from the first parent device 16, and in response add the first parent device 16 to the parent candidate table 36 and attach to the first parent device 16 as illustrated in FIG. 1A.

In response to the processor circuit 42 of the network device 12 attaching to the first parent device 16, the processor circuit 42 can determine (e.g., measure) the network performance 28a via the first parent device 16 during attachment to the first parent device 16. For example, the processor circuit 42 of the network device 12 can measure round trip delay, jitter, packet drop rate, etc., based on establishing a connection (e.g., a TCP connection) 46a with the destination network device 24 via the first parent device 16, illustrated in FIG. 1A; other techniques can be used for determining the network performance 28a (or network performance 28b of FIG. 1B, described below), for example as illustrated in RFC 2988 or RFC 6298, or receiving metric data measured by the destination network device 24 via the connection 46a.

The device interface circuit 40 of the network device 12 is configured for detecting in operation 52 the false DIO message 30 from the rogue network device 14 (the "second parent device" in FIG. 3), for example according to RFC 6550, where the false DIO message 30 may or may not include a compromised security key. The processor circuit 42 of the network device 12 can detect in operation 52 the rogue network device 14 in response to the false DIO message 30 from the rogue network device 14, including identifying that the false DIO message 30 advertises better network performance than the metrics specified in the DIO received from the first parent device 16; alternately, the false DIO message 30 could specify better network performance in the form of unverified metrics that are better than the network performance 28a measured by the network device 12 during attachment to the first parent device 16. Hence, the processor circuit 42 of the network device 12 can respond to the false DIO message 30 by adding in operation 52 the rogue network device 14 to the parent candidate table 36 and attaching 38 to the rogue network device 14, as illustrated in FIG. 1B.

In response to the processor circuit 42 of the network device 12 attaching 38 to the rogue network device 14 as illustrated in FIG. 1B, the processor circuit 42 can determine (e.g., measure) in operation 54 the network performance 28b via the rogue network device 14 during attachment to the rogue network device 14, as described previously with respect to the network performance 28a for the first parent device 16 in operation 50 as illustrated in FIG. 1A. Hence, the processor circuit 42 of the network device 12 can measure round trip delay, jitter, packet drop rate, etc., based on establishing a corresponding connection 46b with the destination network device 24 via the rogue network device 14; as described previously, other techniques can be used for determining the network performance 28b, for example as illustrated in RFC 2988 or RFC 6298, or receiving metric data measured by the destination network device 24 via the connection 46b.

The processor circuit 42 of the network device 12, having obtained the network performance 28a for the first parent device 16 in operation 50 and the network performance 28b for the rogue network device 14 in operation 54, can determine in operation 56 whether the network performance 28b for the rogue network device 14 (the "second parent device" in FIG. 3) is worse as a consequence of attaching 38 to the rogue network device 14. For example, the processor circuit 42 of the network device 12 in operation 56 can determine whether the network performance 28b is worse than the advertised better network performance as specified in the false DIO message 30, the network performance 28a via the first parent device 16, or an estimated network performance via the rogue network device 14. The network performance 28 is deemed as "worse" in operation 56 if the processor circuit 42 deems there is sufficient degradation in the network performance 28b as to warrant "rollback" to the first parent device 16 without concern of "flapping" between two parent network devices; in other words, the sufficient degradation overcomes an identifiable hysteresis that identifies the network performance 28b as sufficiently worse than advertised by the rogue network device 14, previously encountered by the network device 12, or estimated by the network device 12. As illustrated in FIG. 1B, one example of the comparison 56 is whether the round trip delay "$RT_B$" 28b via the connection 46b (over the LAN/WAN 26) and rogue network device 14 is substantially greater than the corresponding round trip delay "$RT_A$" 28a via the connection 46a (over the LAN/WAN 26) and first parent device 16, where "substantially greater" can be about twenty-five percent (25%) or more; other example comparisons as performed in operation 56 are described below with respect to FIG. 4.

The network performance 28 in operation 56 also can be compared to an estimated network performance that can be calculated by the processor circuit 42 of the network device 12 (or the destination network device 24). For example, assuming the rogue network device 14 advertises as the root 20, the processor circuit 42 of the network device 12 can calculate an estimated round-trip delay ("$RT_{ESTIMATED}$") based on the latency between a single hop (t_hop) from the network device 12 to the "root" (as advertised by the rogue network device 14), and the latency between the root 20 and the destination network device 24 (t_WAN), such that:

$$RT_{ESTIMATED}=t\_WAN+2\times(t\_hop).$$

Hence, if in operation 56 the network performance 28b is determined by the processor circuit 42 of the network device 12 to be "$RT_B$=t_WAN+2×3(t_hop)" (indicating the network device 12 is three hops away from the root 20 and not one hop as advertised by the rogue network device 14), the processor circuit 42 of the network device 12 in operation 58 can "revert" (i.e., "roll-back") from the attachment 38 to the rogue network device 14 by detaching 32 from the rogue network device 14 (e.g., by deleting the rogue network device 14 from its parent candidate table 36) and reattaching 34 to the first parent device 16 (e.g., by reinstating the first parent device 16 as the primary attachment point in the DODAG 18). As apparent from the foregoing, if in operation 56 the processor circuit 42 of the network device 12 determines the determined network performance is not worse, but is consistent with the received DIO advertisements for improved network performance as would be advertised by one of the RPL network devices 22, the network device 12 in operation 60 can remain attached to the second parent device.

The processor circuit 42 of the network device 12 in operation 62 also can add the rogue network device 14 to a "prohibited parents" list in its memory circuit 44, and optionally notify the root 20 and/or a network administrator of the second parent device 14 as a potential rogue device in the DODAG 18.

Instances may arise where a parent network device (or the root 20) may appear to have poor performance though the parent network device (or the root 20) is not a rogue device, for example in the case of an overloaded first hop network device encountering high traffic volume, or poor physical/link layer conditions. One technique for mitigating poor performance due to high traffic volume can include the parent network device (or the root 20) exposing access metrics in a DIO so as to repel excess clients; control system techniques also can be applied to minimize oscillations in switching between different parent devices.

A powered network device 12 also can be configured to distinguish causes of poor network performance that can cause the processor circuit 42 of the network device 12 to remain attached in operation 60: for example, the processor circuit 42 can observe the physical and/or link layer access medium to identify poor network performance due to poor physical/link layer medium conditions, including for example detecting high amounts of energy and small gaps (indicating overuse and collisions); the processor circuit 42 also can detect poor physical/link layer medium conditions based on detecting long delays in its own transmit queues when operating in Collision Sense Media Access (CSMA) mode.

Hence, the network device 12 in operation 56, in response to detecting poor network performance due to poor physical/link layer medium conditions, and determining that otherwise the metrics in the advertised DIO are otherwise valid (true), can remain attached in operation 60 to the second parent device.

Figure 4:
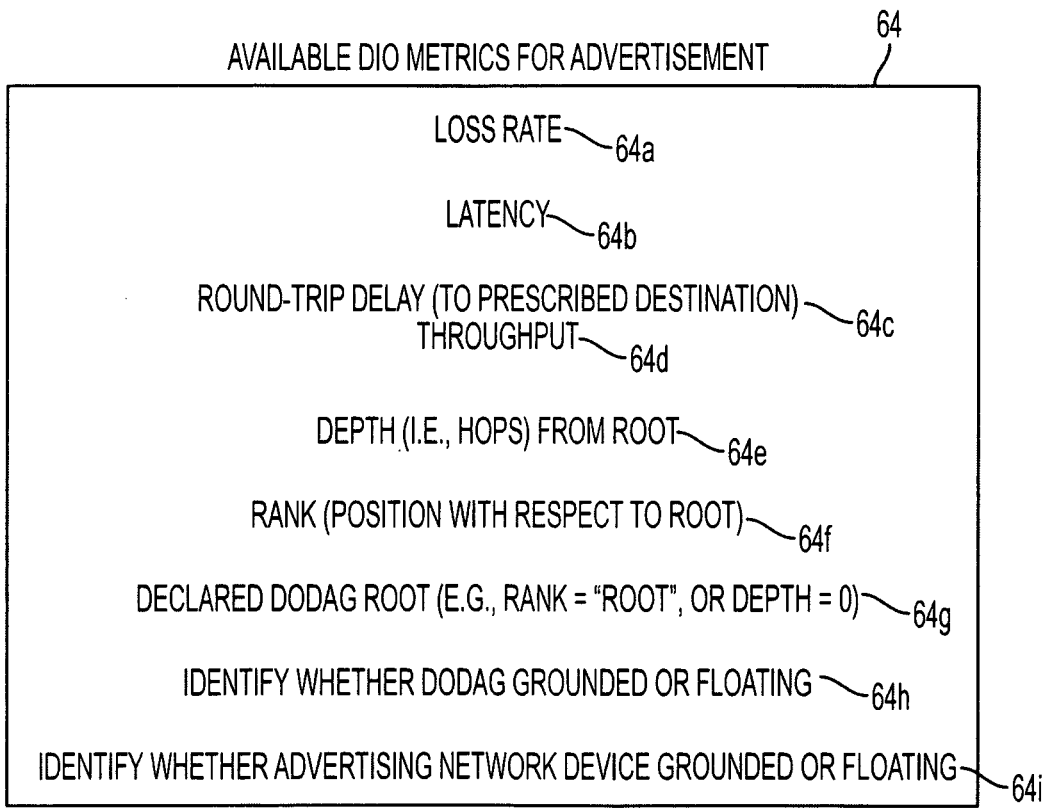
FIG. 4 illustrates example metrics advertised by parent device and used by a network device to determine whether to reattach to a prior parent device, according to an example embodiment.

FIG. 4 illustrates other example metrics 64 that can be used by the processor circuit 42 of the network device 12 in operations 50, 52, 54, and 56 to identify a relative network performance relative to different parent devices according to different objective functions. Example metrics 64 can include packet loss rate 64a, latency (e.g., one-direction delay from the advertising network device to an identified destination such as the destination network device 24), round-trip delay (e.g., typically twice the latency described herein as the one-way delay) 64c, throughput or "bandwidth" (e.g., number of bytes or data packets that can be forwarded by the advertising network per unit time) 64d, depth (i.e., the number of hops from the root 20) (equals zero if the advertising network device advertises as the root 20) 64e, rank (identifying a position with respect to the root 20, see, e.g., RFC 6550) 64f, a data structure (e.g., a "flag") 64g identifying whether the advertising network device declares itself to be the root 20, a data structure (e.g., a "flag") 64h identifying whether the associated DODAG 18 is grounded or floating as defined in RFC 6550, and a data structure (e.g., a "flag") 64i identifying whether the advertising network device is grounded or floating.

As apparent from the foregoing, various metrics can be used for identifying relative network performance between different parent devices, depending on the optimization objective being applied in the DODAG 18. The example embodiments enable the network device 12 to utilize any one of the metrics 64 (or any combination thereof) to determine whether an advertising network device is outputting false (or at least inaccurate) metrics in a false advertisement message that warrants the network device 12 detaching from the advertising network device and reattaching to a prior parent device. The example embodiments enable a RPL device to mitigate attempted man-in-the-middle attacks by a rogue network device in the DODAG, with minimal complexity and without the necessity of security-based schemes such as key-based authentication.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
attaching, by a network device, to a first parent device in a data network having a tree-based network topology, and during attachment to the first parent device the network device detecting a prescribed message generated by a second network device in the data network, the prescribed message advertising the second network device as a second parent device in the tree-based network topology according to a prescribed routing protocol used to establish the tree-based network topology;
attaching, by the network device, to the second parent device in response to the network device detecting that the second parent device is advertising, within the prescribed message according to the prescribed routing protocol, a metric offering better network performance than advertised by the first parent device, the tree-based network topology providing multi-hop routes toward a root network device and the first parent device providing one of the multi-hop routes toward the root network device; and
detaching, by the network device from the second parent device, wherein the detaching includes the network device avoiding a future attachment to the second parent device and removing the second parent device from a parent candidate table, and the network device reattaching to the first parent device, in response to the network device determining the corresponding network performance via the second parent device is worse than the advertised better network performance specified in the prescribed message received by the network device while attached to the first parent device.

2. The method of claim 1, further comprising:
detecting, by the network device from the first parent device, a first unsecured advertisement advertising a first metric;
detecting, by the network device, the prescribed message as a second unsecured advertisement advertising said metrtic as a second metric, the first and second unsecured advertisements not requiring any security key;
the second metric identifying any one of: a loss rate of the second parent device, a latency of the second parent device reaching a prescribed destination, a round-trip delay between the second parent device and the prescribed destination, a throughput of the second parent device, a depth of the second parent device relative to an identified root of the tree-based network topology, a rank of the second parent device relative to the identified root, a first designation for the second parent device as a root of the tree-based network topology, or a second designation for the second parent device as a grounded network node.

3. The method of claim 1, further comprising measuring, by the network device, the corresponding network performance via the second parent device as a second measured network performance.

4. The method of claim 3, wherein:
the second measured network performance is a measured round-trip delay for communicating with a prescribed destination via the second parent device.

5. The method of claim 4, further comprising detecting, by the network device, the first parent device via a first unsecured advertisement and the second parent device via the prescribed message implemented as a second unsecured advertisement, wherein the first and second unsecured advertisements do not require any security key.

6. The method of claim 1, wherein the avoiding includes adding the second network device to a prohibited parents list.

7. The method of claim 1, wherein the avoiding includes notifying the root network device of the tree-based network topology that the second parent device is a potential rogue device in the tree-based network topology.

8. An apparatus comprising:
a device interface circuit configured for detecting a first parent device in a data network having a tree-based network topology, the tree-based network topology providing multi-hop routes toward a root network device and the first parent device providing one of the multi-hop routes toward the root network device; and
a processor circuit configured for causing the apparatus to attach to the first parent device as a network device, the processor circuit further configured for detecting, during attachment to the first parent device, a prescribed message received by the device interface circuit and generated by a second network device advertising via the prescribed message as a second parent device in the tree-based network topology according to a prescribed routing protocol used to establish the tree-based network topology;

the processor circuit further configured for causing the apparatus to attach to the second parent device in response to the processor circuit detecting that the second parent device is advertising, within the prescribed message according to the prescribed routing protocol, a metric offering better network performance than advertised by the first parent device;

the processor circuit further configured for detaching from the second parent device, wherein the detaching includes the processor circuit avoiding a future attachment to the second parent device and removing the second parent device from a parent candidate table, and reattaching to the first parent device, in response to the processor circuit determining the corresponding network performance via the second parent device is worse than the advertised better network performance specified in the prescribed message received while attached to the first parent device.

9. The apparatus of claim 8, wherein:
the processor circuit is configured for detecting the first parent device in response to a first unsecured advertisement received from the first parent device and advertising a first metric;
the processor circuit is configured for detecting the second parent device in response to the prescribed message as a second unsecured advertisement received from the second parent device advertising said metric as a second metric, the first and second unsecured advertisements not requiring any security key;
the second metric identifying any one of: a loss rate of the second parent device, a latency of the second parent device reaching a prescribed destination, a round-trip delay between the second parent device and the prescribed destination, a throughput of the second parent device, a depth of the second parent device relative to an identified root of the tree-based network topology, a rank of the second parent device relative to the identified root, a first designation for the second parent device as a root of the tree-based network topology, or a second designation for the second parent device as a grounded network node.

10. The apparatus of claim 8, the processor circuit is configured for measuring the corresponding network performance via the second parent device as a second measured network performance.

11. The apparatus of claim 10, wherein:
the second measured network performance is a measured round-trip delay for communicating with a prescribed destination via the second parent device.

12. The apparatus of claim 11, wherein the processor circuit is configured for detecting the first parent device via a first unsecured advertisement and the second parent device via the prescribed message implemented as a second unsecured advertisement, wherein the first and second unsecured advertisements do not require any security key.

13. The apparatus of claim 8, wherein the processor circuit is configured for avoiding the future attachment based on adding the second network device to a prohibited parents list.

14. The apparatus of claim 8, wherein the processor circuit is configured for notifying the root network device device of the tree-based network topology that the second parent device is a potential rogue device in the tree-based network topology.

15. One or more non-transitory tangible media encoded with logic for execution by a machine and when executed by the machine operable for:
attaching, by the machine implemented as a network device, to a first parent device in a data network having a tree-based network topology, and during attachment to the first parent device the network device detecting a prescribed message generated by a second network device in the data network, the prescribed message advertising the second network device as a second parent device in the tree-based network topology according to a prescribed routing protocol used to establish the tree-based network topology;
attaching to the second parent device in response to the network device detecting that the second parent device is advertising, within the prescribed message according to the prescribed routing protocol, a metric offering better network performance than advertised by the first parent device, the tree-based network topology providing multi-hop routes toward a root network device and the first parent device providing one of the multi-hop routes toward the root network device; and
detaching from the second parent device, wherein the detaching includes the network device avoiding a future attachment to the second parent device and removing the second parent device from a parent candidate table, and reattaching to the first parent device, in response to the network device determining the corresponding network performance via the second parent device is worse than the advertised better network performance specified in the prescribed message received by the network device while attached to the first parent device.

16. The one or more non-transitory tangible media of claim 15, further operable for the network device measuring the corresponding network performance via the second parent device as a second measured network performance.

17. The one or more non-transitory tangible media of claim 16, wherein:
the second measured network performance is a measured round-trip delay for communicating with a prescribed destination via the second parent device.

18. The one or more non-transitory tangible media of claim 17, further operable for the network device detecting the first parent device via a first unsecured advertisement and the second parent device via the prescribed message implemented as a second unsecured advertisement, wherein the first and second unsecured advertisements do not require any security key.

19. The one or more non-transitory tangible media of claim 15, wherein the avoiding includes adding the second network device to a prohibited parents list.

20. The one or more non-transitory tangible media of claim 15, wherein the avoiding includes notifying the root network device device of the tree-based network topology that the second parent device is a potential rogue device in the tree-based network topology.

* * * * *